Aug. 28, 1956     J. E. WALLACE     2,760,642

FILTER

Filed April 19, 1954

INVENTOR.
JAMES E. WALLACE
BY
Mellin and Hanscom
ATTORNEYS

United States Patent Office 2,760,642
Patented Aug. 28, 1956

2,760,642

FILTER

James E. Wallace, Long Beach, Calif., assignor to Engine Life Products Corporation, El Monte, Calif., a corporation of California Application April 19, 1954, Serial No. 424,233

2 Claims. (Cl. 210—131)

This application relates to the art of filters, and more particularly to an oil filter of the replaceable cartridge type wherein the filter housing is provided with an inlet adjacent its lower end and an outlet centrally located in the lower end connected to a central collector tube which projects upwardly within the replaceable cartridge.

The principal object of this invention is to provide a novel form of sealing member for sealing between the housing and top of a cartridge type oil filter.

Another object of this invention is to provide a novel form of sealing member for sealing between the housing and top of a cartridge type oil filter wherein said sealing member also serves to center the cartridge in the housing.

A further object of this invention is to provide a sealing member of the character dsecribed in the preceding objects wherein said sealing member also seals the space between the cartridge and housing but wherein said sealing member will permit bypass of oil therebetween to relieve excess pressure if the cartridge should become clogged.

Various other objects of the instant invention will become apparent in reading the following detailed specification in conjunction with the accompanying drawings, wherein.

Figure 1:
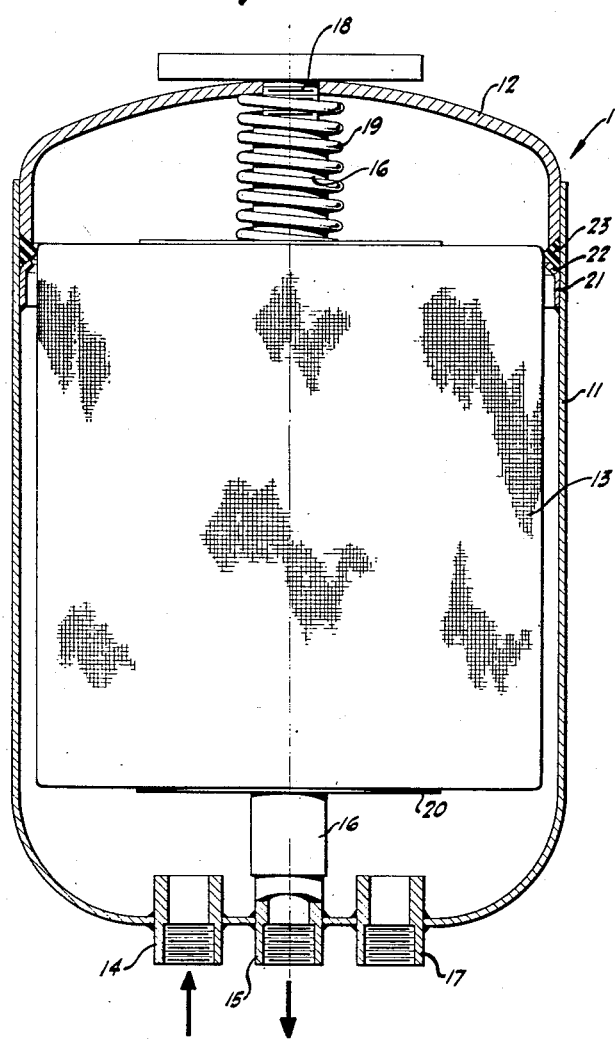
Fig. 1 is a longitudinal sectional view of a filter embodying the principles of my invention.
Figure 2:
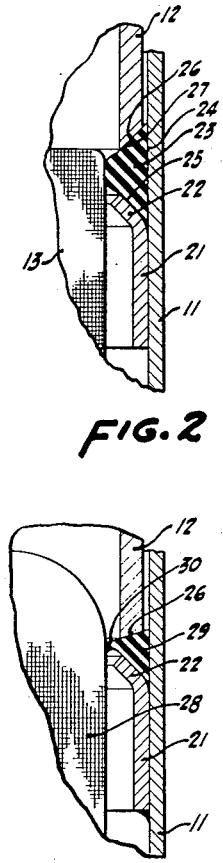
Fig. 2 is a sectional view of a portion of the filter shown in Fig. 1, showing the details of the sealing member and the associated parts of the filter on a greatly enlarged scale.

Referring now to the drawings, there is disclosed a filter 10 comprising a housing 11, a top 12 and a filter cartridge 13. An inlet fitting 14 is located in the bottom of the housing 11 and communicates with the space inside of the housing below the filter cartridge 13. An outlet fitting 15 is located centrally in the bottom of the housing 11 and connects to an upstanding collector tube 16 inside of the housing 11. The lower end of the housing 11 is also provided with a normally closed drain opening 17. The top 12 of the housing is adapted to be slidably received within the upper end of the housing 11 and held therein by a bolt 18 which extends through the central portion of the top 12 and is threaded into the upper end of the collector tube 16. A spring 19 bears against the underside of the top 12 and the upper end of the cartridge 13 and forces the cartridge 13 downwardly into sealing engagement with an annular flange 20 fastened to the collector tube 16 adjacent to but spaced from the lower end thereof.

An annular ring 21 is fastened to the inside of the housing 11 adjacent to but spaced downwardly from the top thereof. The upper end of the ring 21 is bent inwardly to form an inwardly and upwardly inclined shoulder 22. An annular sealing member 23 triangular in cross-section, with one side of the triangle 24 facing outwardly, rests with another of its sides 25 on the shoulder 22. The lower end of the top 12 is formed with an upwardly and outwardly beveled face 26 which rests against the third face 27 of the triangular sealing member 23.

Figure 3:
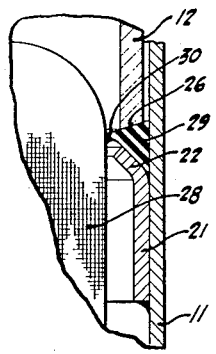
Fig. 3 is a similar view to that shown in Fig. 2 and illustrates a modified form of the sealing member.

In the modification shown in Fig. 3, the sealing member 29 is designed for use with a sock type filter element 28. The sealing member 29 is generally triangular in cross-section, similar to the sealing member 23 described above, and cooperates with the housing 11, shoulder 22 and the bevel 26 on the top 12 in the same manner as described above. The sealing member 29 has the inwardly facing point of the triangle curved downwardly to form a hook-shaped lip 30.

In the assembly of the described device, the cover 12 is removed and the appropriate sealing member 23 or 29 is inserted in the groove formed by the shoulder 22 and the housing 11. The cartridge 13 or the sock type filter element 28 is then inserted. The top 12 is then slid into the upper end of the housing 11 and fastened down by the bolt 18. The sealing member 23 or 29 effectively seals against the shoulder 22, the inner wall of the housing 11, and the lower beveled face 26 of the top 12 and prevents leakage between the housing and the top. Further, the inner point of the sealing member 23 or 29 abuts the filter element 28 or cartridge 13 to center the same within the housing and to prevent fluid from passing upwardly around the filter element or cartridge into the upper part of the housing.

In use, oil is pumped into the housing through fitting 14 and up around the outside of the filter cartridge 13 or element 28. Since the oil cannot pass the seal 23 or 29, it is forced inwardly through the cartridge 13 or element 28 and collected in the tube 16 (in a manner well known in the art), and returns to the engine through the outlet fitting 15. If the cartridge 13 or element 28 becomes clogged, and the oil can no longer pass therethrough, the pressure will distort the inwardly facing point of the seal 23 or 29 and permit the oil to bypass upwardly around the upper end of the cartridge 13 or element 28 and downwardly through the central bore therethrought into the collector tube 16.

From the foregoing description, it may be seen that I have provided a novel form of sealing element for an oil filter assembly which not only seals the housing to the top of the assembly but also centers and seals around the filter element thereof, and which sealing element acts as a bypass valve to permit bypass of the fluid around the filter element if said element should become clogged.

While I have shown and described the preferred embodiment of my invention, it is obvious that various changes may be made in its construction by those skilled in the art without departing from the spirit of the invention as defined in the appended claims.

Having thus described my invention, what I claim and desire to secure by Letters Patent is:

1. In a replaceable cartridge type filter, a lower housing member generally cylindrical in shape and closed at its lower end, an inlet opening in said lower housing member, an outlet opening centrally located in the bottom of said lower housing member and connected to the lower end of an upstanding collector tube coaxial with said lower housing member, a replaceable filter cartridge surrounding said collector tube, means sealing the lower end of said filter cartridge to said collector tube, an upwardly and inwardly inclined annular shoulder within and attached to said lower housing member above said inlet opening and adjacent to but spaced downwardly from the upper end of said filter cartridge, an annular sealing member substantially triangular in cross-section resting on said shoulder with one flat surface thereof in contact with the inner surface of said lower housing member and a second flat surface in contact with said annular shoulder, an upper generally cylindrical housing member having a depending skirt adapted to be slidably received within said lower housing member, a downwardly and inwardly beveled surface on the lower end of said depending skirt adapted to rest against the third flat surface of said annular sealing member, and means for forcing said upper housing member downwardly to compress said sealing member between said beveled surface and said shoulder whereby said sealing member is compressed therebetween and the inwardly facing point thereof is forced against said filter cartridge to center said cartridge and to normally prevent the passage of oil around the outside of said cartridge.

2. In a replaceable cartridge type filter, a lower housing member generally cylindrical in shape and closed at its lower end, an inlet opening in said lower housing member, an outlet opening centrally located in the bottom of said lower housing member and connected to the lower end of an upstanding collector tube coaxial with said lower housing member, a replaceable filter cartridge surrounding said collector tube, means sealing the lower end of said filter cartridge to said collector tube, an upwardly and inwardly inclined annular shoulder within and attached to said lower housing member above said inlet opening and adjacent to but spaced downwardly from the upper end of said filter cartridge, an annular sealing member substantially triangular in cross-section resting on said shoulder with one flat surface thereof in contact with the inner surface of said lower housing member and a second flat surface in contact with said annular shoulder, the point opposite said one flat surface being elongated and curved downwardly to form a hook-shaped lip in engagement with said filter cartridge, an upper generally cylindrical housing member having a depending skirt adapted to be slidably received within said lower housing member, a downwardly and inwardly beveled surface on the lower end of said depending skirt adapted to rest against the third flat surface of said annular sealing member, and means for forcing said upper housing member downwardly to compress said sealing member between said beveled surface and said shoulder whereby said sealing member is compressed therebetween and the inwardly facing point thereof is forced against said filter cartridge to center said cartridge and to normally prevent the passage of oil around the outside of said cartridge.

References Cited in the file of this patent

UNITED STATES PATENTS

| | | |
|---|---|---|
| 483,172 | Schroder | Sept. 27, 1892 |
| 2,310,405 | Dodge | Feb. 9, 1943 |
| 2,320,725 | Hautzenroeder | June 1, 1943 |
| 2,569,186 | Ogilvie | Sept. 25, 1951 |
| 2,605,901 | Morrison et al. | Aug. 5, 1952 |
| 2,621,889 | Annin | Dec. 16, 1952 |

FOREIGN PATENTS

| | | |
|---|---|---|
| 678,934 | Great Britain | Sept. 10, 1952 |
| 697,816 | Great Britain | Sept. 30, 1953 |